United States Patent [19]

Lamb

[11] Patent Number: 4,679,592

[45] Date of Patent: Jul. 14, 1987

[54] VALVE SEAT DESIGN TO REDUCE CAVITATION

[75] Inventor: C. Paul Lamb, Dallas, Tex.

[73] Assignee: Teledyne Industries, Inc., Calif.

[21] Appl. No.: 785,067

[22] Filed: Oct. 7, 1985

[51] Int. Cl.[4] .................... F16K 47/16; F16K 47/02
[52] U.S. Cl. ..................... 137/625.33; 137/625.37; 251/121; 251/127
[58] Field of Search ................. 137/625.33, 625.37, 137/625.38, 625.3; 251/121, 122, 127, 208, 209

[56] References Cited

U.S. PATENT DOCUMENTS

| | | | |
|---|---|---|---|
| 833,672 | 10/1906 | Butler | 137/625.33 |
| 1,043,935 | 11/1912 | Hitchcock | 251/209 X |
| 1,197,583 | 9/1916 | Sheridan . | |
| 1,883,720 | 10/1932 | Grimes . | |
| 1,954,044 | 4/1934 | Guildford . | |
| 1,956,101 | 4/1934 | Le Noir | 137/625.3 |
| 2,094,222 | 9/1937 | Smith . | |
| 2,096,021 | 10/1937 | Aherne . | |
| 2,193,725 | 3/1940 | Heigis . | |
| 2,210,480 | 8/1940 | Brice . | |
| 2,243,592 | 5/1941 | Wolf . | |
| 2,501,593 | 3/1950 | Becker . | |
| 2,762,397 | 9/1956 | Miller . | |
| 2,782,800 | 2/1957 | Hillebrand . | |
| 2,927,767 | 3/1960 | Ray . | |
| 3,072,261 | 1/1963 | Smith . | |
| 3,156,262 | 11/1964 | Attebo . | |
| 3,921,672 | 11/1975 | Arnold . | |
| 4,132,386 | 1/1979 | Lee . | |
| 4,540,022 | 9/1985 | Cove | 137/625.37 X |

FOREIGN PATENT DOCUMENTS

| | | | |
|---|---|---|---|
| 1600927 | 6/1970 | Fed. Rep. of Germany | 251/127 |
| 967482 | 8/1964 | United Kingdom | 137/625.33 |
| 2088025 | 6/1982 | United Kingdom | 137/625.33 |

Primary Examiner—Arnold Rosenthal
Attorney, Agent, or Firm—John F. Booth; Gerald G. Crutsinger; Norman L. Gundel

[57] ABSTRACT

Disclosed is a valve trim design for use in reducing valve cavitation. Valve and seat are axially movable and have frustoconical facing surfaces which form an annulus therebetween to control flow. The seat has an external frustoconical surface and a plurality of pairs of ports communicating with an internal bore. The ports are aligned so that flow from the ports impinge upon each other within the interior chamber of the valve seat to reduce cavitation.

15 Claims, 3 Drawing Figures

VALVE SEAT DESIGN TO REDUCE CAVITATION

BACKGROUND OF THE INVENTION

1. Field of the Invention

The invention relates to a valve seat design to reduce cavitation of liquid and erosion in a flow control valve generally used as a choke.

2. Description of the Prior Art

The removable internal parts of a valve are generally referred to as the "trim" and generally function to proportion the valve orifice area to control flow through the valve. Erosion of the valve trim is a major problem in valves controlling flow of high velocity liquid. Cavitation may occur if the pressure of liquid flowing through restricted passages becomes less than the vapor pressure of the liquid at the operating temperature. Flow control valves usually experience cavitation when a high pressure drop is created across a single point of pressure reduction.

Flow of fluid through an orifice is narrowed downstream of the orifice to form a vena contracta, which is the location of highest velocity of fluid through the valve and the location of the lowest pressure. As fluid velocity decelerates downstream of the orifice, pressure is regained and the vapor bubbles collapse or implode violently, expending energy which is absorbed by the valve causing cavitation related wear, fatigue and eventual failure.

Various trims which reduce cavitation are shown in *ISA HANDBOOK OF CONTROL VALVES*, 2nd Ed, 1976 Instrument Society of America. In cage hole designs to reduce cavitation, a cylindrical cage member with circumferentially opposed opening directs flow to impinge upon itself. These designs do reduce cavitation; however, the cylindrical trim elements with openings therein tend to foul and create localized erosion and flow cutting. In cascading designs trim is designed to create a series of smaller pressure drops to reduce cavitation. However, these cascading type trims tend to reduce flow capacity and are expensive to manufacture.

In addition, heretofore it has been necessary to select valves having trim of various designs depending upon the velocity of fluid and field conditions under which a flow control valve is to be used for oil field service.

SUMMARY OF THE INVENTION

The valve disclosed herein and illustrated in the attached drawings incorporates improved trim elements including a valve seat element having a central bore formed therein and a valve element having a skirt portion to control flow to the bore in the seat element. A truncated conical seat surface is formed on the seat element and a plurality of orifices extend through the seat surface to communicate with the central bore. This seat element has an end portion closing one end of the bore, the end portion being provided with an orifice which is axially aligned with the bore formed in the seat element. The orifices formed in the seat surface generally comprise spaced pairs of aligned orifices having axes which extend perpendicular to the axis of the bore in the seat element. The pairs of orifices extending through the seal element are spaced longitudinally of the seat element and each pair is circumferentially spaced from each adjacent pair to form a plurality of tortuous flow paths to form a plurality of flow streams which impinge against each other to minimize cavitation in the valve.

DESCRIPTION OF DRAWINGS

Drawings of a preferred embodiment of the invention are annexed hereto so that the invention may be better and more fully understood, in which.

Numeral references are employed to designate like parts throughout the various figures of the drawings.

DESCRIPTION OF A PREFERRED EMBODIMENT

Figure 1:
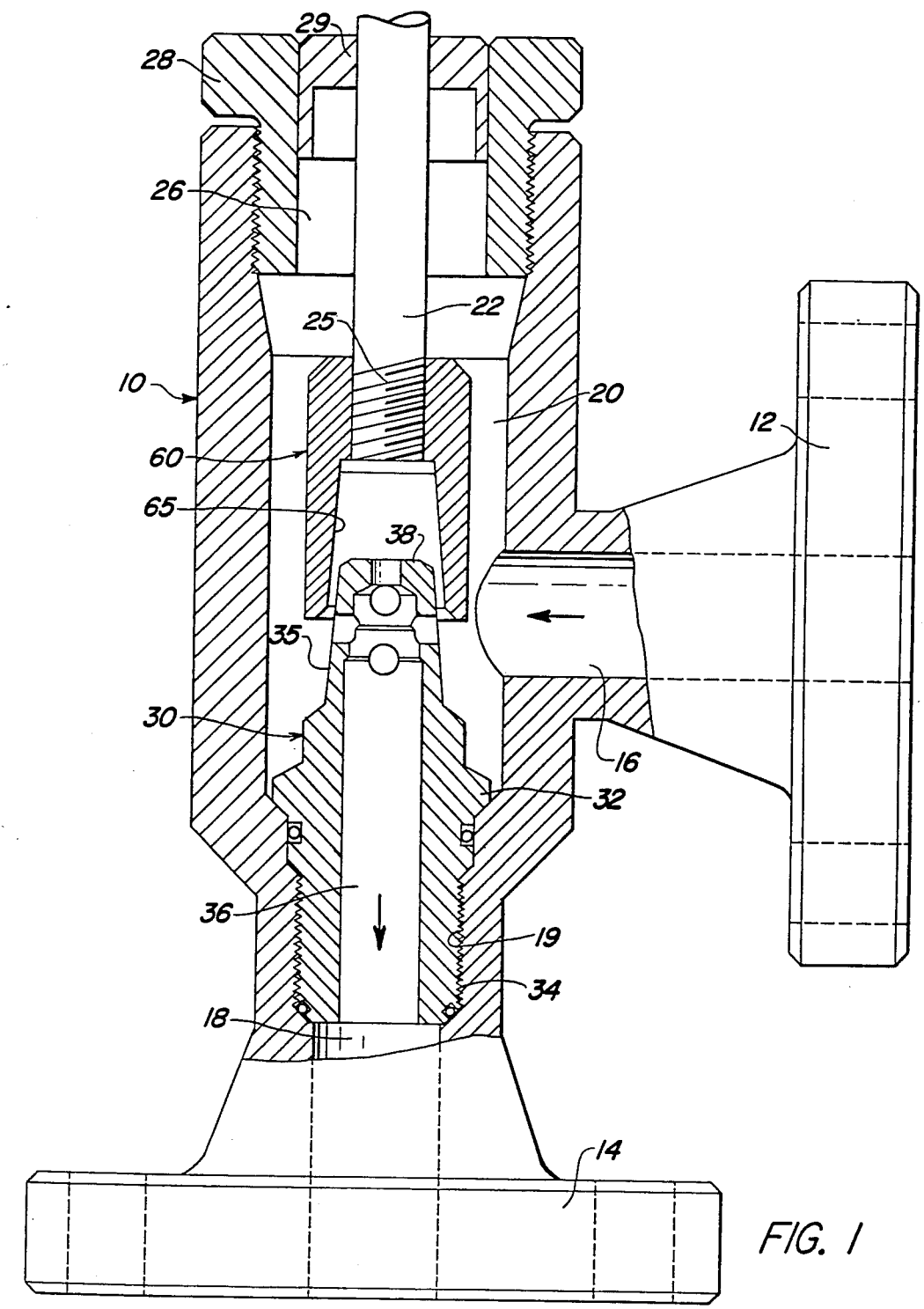
FIG. 1 is an elevational view of a flow control valve incorporating the improved valve seat design to reduce cavitation.

Referring to FIG. 1 of the drawing, the numeral 10 generally designates a flow control valve body having an inlet connector 12 and an outlet connector 14 having inlet passage 16 and outlet passage 18 formed therein. Valve body 10 has a valve chamber 20 with which inlet passage 16 and outlet passage 18, respectively, communicate to receive fluid flowing from inlet passage 16 to outlet passage 18.

As will be hereinafter more fully explained, outlet passage 18 has an internally threaded portion 19 in which a seat element generally designated by the numeral 30 is mounted. A valve element generally designated by numeral 60 is secured to a rising stem 22 having a hand wheel, not shown, mounted thereon. Stem 22 has a threaded portion 25 which extends through a threaded opening in a bonnet 26. A bonnet retaining sleeve 28 extends into a threaded opening in valve body 10 and urges seals on bonnet 26 into sealing engagement with valve body 10. A packing cup 29 is secured to stem 22 adjacent bonnet 26. Valve bonnets of the type hereinbefore briefly described are well known to persons skilled in the art and further description of obviousness is not deemed necessary.

Valve seat element 30 comprises a valve seat element body 32 having a threaded end 34 which engages threaded portion 19 of outlet passage 18 in valve body 10. A truncated conical seat surface 35 is formed on the opposite end of body 32. A bore 36 is formed in seat body 32 and extends through the threaded end portion 34 and communicates with outlet passage 18. The opposite end of bore 36 is closed by an end wall 38.

Figure 2:
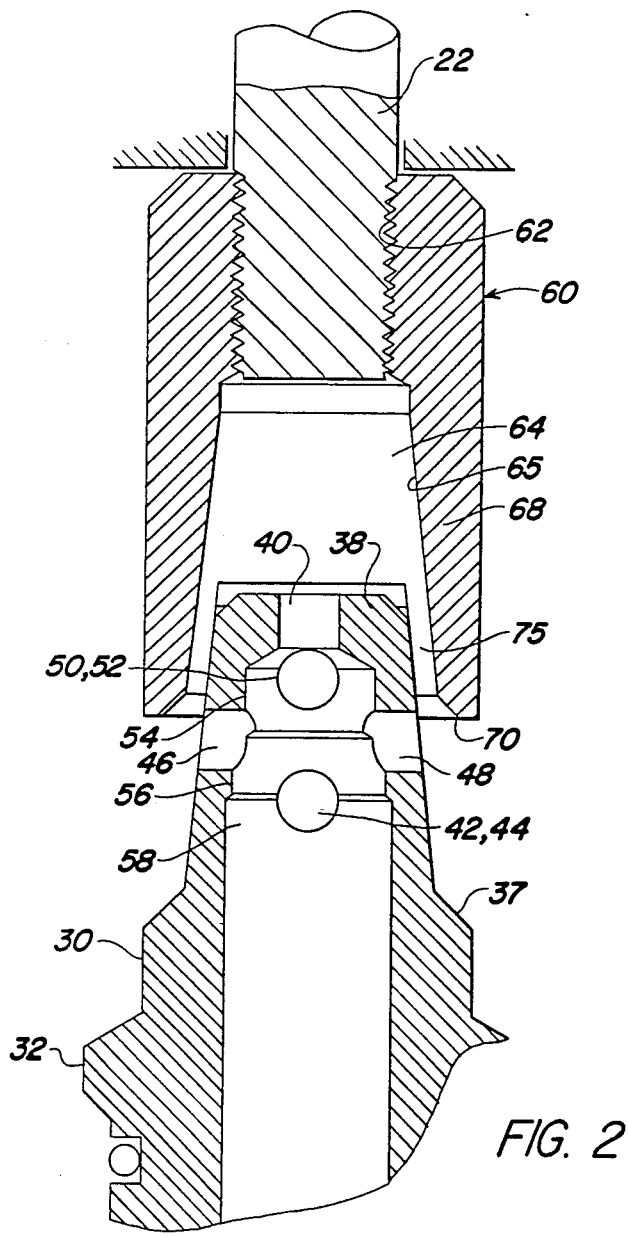
FIG. 2 is an enlarged fragmentary cross sectional view illustrating details of construction of the valve element and the valve seat element.

As best illustrated in FIG. 2 of the drawing, an orifice 40 extends through end wall 38 and is axially aligned with bore 36.

A plurality of orifices 42-52 extend through seat surface 35 and communicate with bore 36 in the valve seat body 32. It is important to note that the first pair of orifices 42 and 44 lie on a common axis which is perpendicular to the axis of bore 36. The second pair of orifices 46 and 48 have a common axis which is perpendicular to the axis of bore 36 and spaced longitudinally of body 32 from the first pair of orifices 42 and 44. Orifices 42 and 44 are circumferentially spaced about the truncated cylindrical seat surface 35 relative to the second pair 46 and 48 of orifices. As illustrated in FIG. 2, a common axis of orifices 42 and 44 is spaced and perpendicular to the common axis of orifices 46 and 48.

A third pair of orifices 50 and 52 have a common axis spaced from, but parallel to the axis of the first pair of orifices 42 and 44.

The bore 36 in seat body 32 has portions 54, 56 and 58 of varying diameter spaced longitudinally along the portion of bore 36 adjacent end wall 38 such that the cross section area of the bore increases progressively from the closed end portion adjacent orifice 40 toward the open end of the bore.

Valve element 60 is a cylindrical member having an internally threaded opening 62 formed in one end thereof and a pocket 64 having a truncated conical wall 65 formed in the opposite end thereof, pocket 64 being surrounded by skirt portion 68 of valve elements 60. When the valve element is in the full closed position, the lower edge 70 of skirt 68 is urged into sealing engagement with surface 37 on valve seat body 32.

A truncated conical seat surface 35 on seat element 30 has the same taper as the inner wall 65 of pocket 64 in valve element 60 such that movement of valve element 60 to the closed position moves surfaces 65 and 35 to adjacent spaced relationship.

As the end 70 of skirt portion 68 moves away from surface, 37, truncated conical wall 65 slowly moves away from tapered seat surface 35 to form an annulus 75. It will be appreciated that when the lower end 70 of skirt 68 engages surface 37, all of the orifices 40-52 are enclosed within the skirt portion of the valve element, thus, blocking fluid flow from inlet passage 16 to outlet passage 18 in the valve body. However, as valve element 60 is moved longitudinally away from seat element 30, the edge 70 of skirt 68 progressively moves past orifices 42 and 44, and then past orifices 46 and 48 as valve element 60 reaches the full open position.

At a mid-stroke position of valve element 60, surface 70 on the end of skirt 68 would enclose a portion of the area of orifices 42 and 44, the other portion of the surface area of the orifices lying outside of pocket 64 in valve element 60. Thus, a portion of fluid flow from inlet passage 16 would flow directly into the uncovered portion of orifices 42 and 44. A portion of fluid flow from inlet passage 16 would flow around the end surface 70 on skirt 68 into the annular passage 75 to reach the covered portion of orifices 42 and 44. Additional flow through annular passage 75 would reach the second pair of orifices 46 and 48 and the third pair of orifices 50 and 52 inside the skirt portion 68 of valve element 60 and also orifice 40 extending through end wall 38.

It will be appreciated that since the orifices of each pair of orifices have a common axis, flow through the orifices will be in opposite directions and streams flowing therethrough will impinge against each other in bore 36. For example, flow through orifices 46 and 48 will impinge in bore 36 and will be mixed with flow of fluid diffused from impingement of flow streams through the other pairs of orifices spaced along the length of bore 36.

In the preferred embodiment of the invention, the sum of the cross sectional area of orifices 40-52 is greater than the cross sectional area of bore 36 such that minimal restriction of flow through the valve will be observed when valve element 60 is in the full open position. In addition, these valves are designed such that in their normal operating range the flow area of annular passage 75 is always less than the sum of the covered portions of the orifices 42-52 plus orifice 40 at all valve positions. As edge 70 of valve element 60 moves toward surface 37 on valve seat element 30, flow will be steadily reduced. It will be observed that the pair of orifices 42-52 extending through seat surface 35 and spaced longitudinally and circumferentially relative to each other form a plurality of tortuous flow paths which form a plurality of flow streams which impinge against each other causing flow to be diffused immediately upon passage through the orifices, thereby minimizing cavitation.

Figure 3:
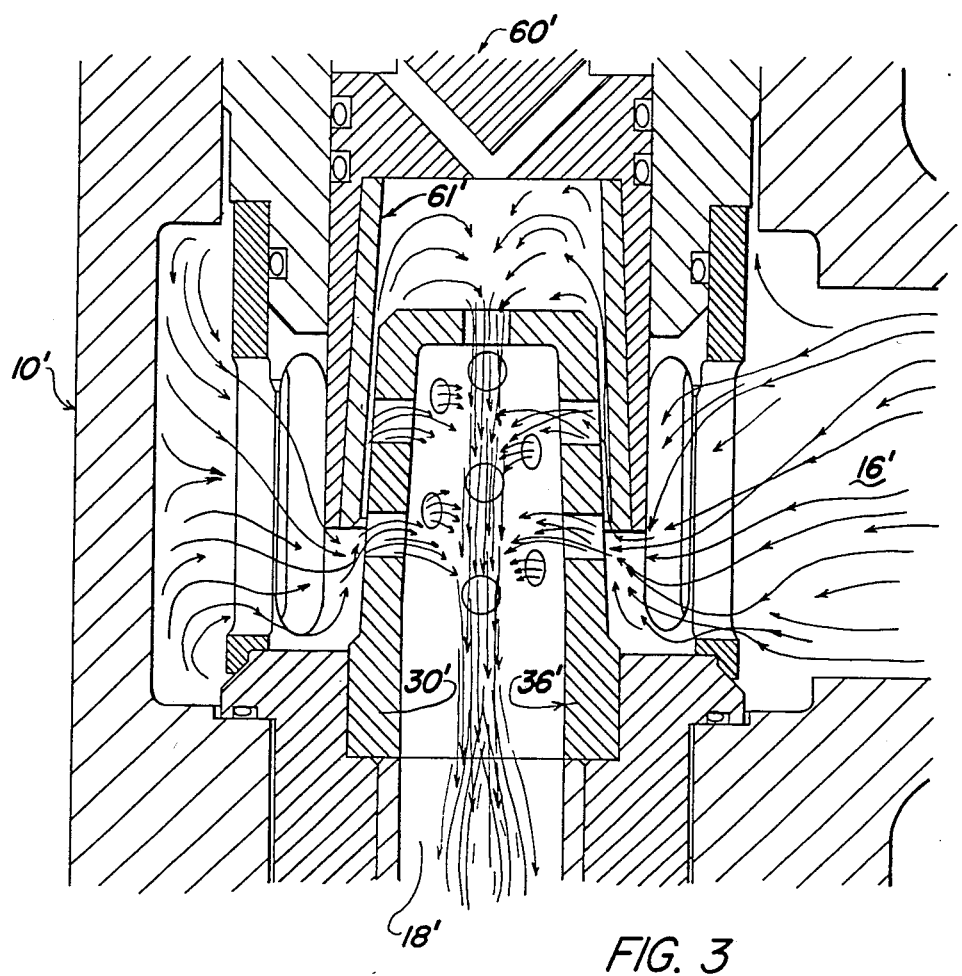
FIG. 3 is a view similar to FIG. 2 showing an alternative embodiment.

In FIG. 3, an alternative embodiment 10' of the present invention is shown. The valve has an inlet passage 16' and an outlet passage 18' through which the flow is regulated. The valve consists of frustoconical-shaped seat and valve elements, 30' and 60' respectively. The valve element 60' is axially movable toward and away from the seed element 30'. The seat element 30' can be formed from a hardened tungsten carbide material to increase life. The bore 36' in the seat element 30' can be likewise frustoconical-shaped to improve valve performance. Valve element 60' can likewise have a frustoconical-shaped tungsten carbide insert 61' pressed into the element.

It is understood, of course, that the foregoing specification discloses exemplary embodiments of the present invention and that numerous modifications, alterations and changes can be made therein without departing from the spirit and scope of the invention as defined in the appended claims.

I claim:

1. In a valve, a valve body having a valve chamber and inlet and outlet passages; a valve seat element in said chamber between said inlet passage and said outlet passage, said seat element having a bore formed therein; an end portion on said seat element closing said bore; a truncated conical seat surface on said seat element, said seat surface having a plurality of orifices extending therethrough and communicating with said bore; a valve element having a skirt portion and a pocket formed therein, said pocket having a truncated conical wall; and means movably securing said valve element in said valve chamber such that a portion of said seat element extends into said pocket in said valve element and said skirt portion of said valve element covers a portion of said plurality of orifices to form a plurality of tortuous flow paths.

2. A valve according to claim 1, said orifices extending through said seat surface comprising a plurality of axially aligned pairs of orifices, said pairs being spaced longitudinally of said seal element.

3. A valve according to claim 2, each said pair of axially aligned orifices having an axis extending perpendicular to the axis of said bore.

4. A valve according to claim 2, said end wall having an orifice extending therethrough for communicating said bore with said valve chamber, said end wall orifice being axially aligned with the bore formed in said seat element.

5. A valve according to claim 4, wherein the sum of the cross-sectional areas of the orifices extending through said seat surface and the orifice extending through said end wall is greater than the cross sectional area of the bore in the seat element.

6. A valve according to claim 5 wherein the sum of the areas of the orifices is at least about 20% greater than the cross sectional area of the bore.

7. A valve according to claim 1 wherein said plurality of orifices in said seat comprises a plurality of sets of orifices, each set comprising at least two orifices which are circumferentially spaced equidistance from each other and lie in a single plane.

8. A valve according to claim 7, each said axially aligned sets of orifices being spaced circumferentially of said seat element relative to each adjacent sets.

9. A valve according to claim 1 wherein the sum of the cross-sectional areas of the orifices extending through said seat surface is greater than the cross sectional area of the bore in the seat element.

10. A valve according to claim 8, said bore in said seat element having a variable cross sectional area along the length thereof and where the cross sectional area adjacent the end wall of said seat element being of a smaller diameter than the portion spaced away from said end wall.

11. A valve seat element for a flow control valve comprising a body portion having a bore formed therein; an end wall on said body portion closing one end of said bore; a truncated conical seat surface on said body adjacent said end wall; a plurality of pairs of longitudinally spaced orifices extending through said truncated conical seat surface, each pair of orifices communicating with said bore, said end wall having an orifice formed therein communicating with said bore; and connector means on said body connectable to a flow control valve.

12. A valve seat element according to claim 11 wherein the orifices of each pair are axially aligned with an axis perpendicular to the axis of said bore.

13. A valve seat element according to claim 12 said bore in said body having portions of different diameters adjacent said plurality of orifices.

14. A valve seal element according to claim 12 wherein the sum of the cross-sectional areas of the orifices extending through the seat surface and the orifice formed in said end wall is greater than the cross-sectional area of said bore.

15. A valve seat according to claim 14 wherein the cross-sectional areas of all of said orifices is at least about twenty percent greater than the cross-sectional area of said bore.

* * * * *

UNITED STATES PATENT AND TRADEMARK OFFICE
CERTIFICATE OF CORRECTION

PATENT NO. : 4,679,592

DATED : July 14, 1987

INVENTOR(S) : C. Paul Lamb

It is certified that error appears in the above-identified patent and that said Letters Patent is hereby corrected as shown below:

In Column 1, line 39, after "designs" and -- , --; in Column 3, line 14, change "elements" to -- element --.

Signed and Sealed this

Fifteenth Day of December, 1987

Attest:

DONALD J. QUIGG

*Attesting Officer*  *Commissioner of Patents and Trademarks*